Sept. 15, 1942.  D. S. BOND  2,295,629
FREQUENCY CONTROL SYSTEM
Filed Oct. 31, 1940
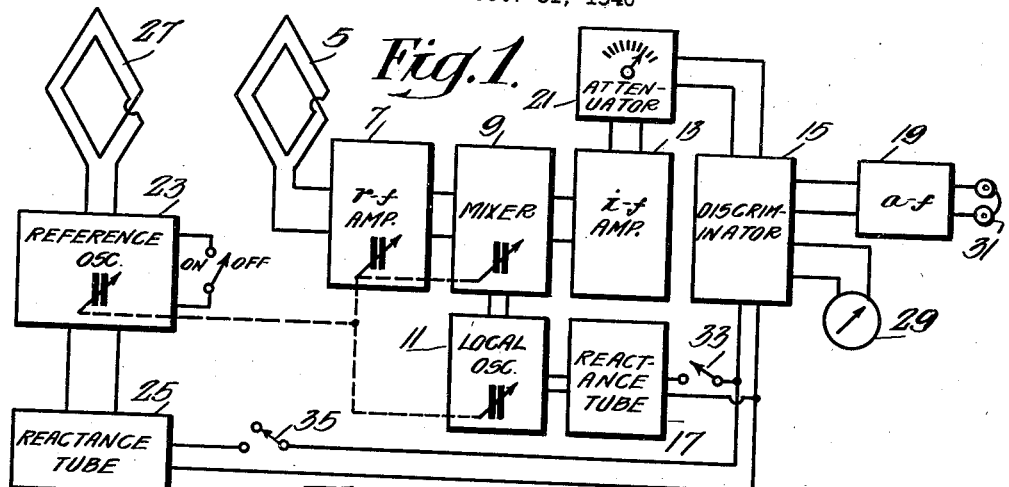
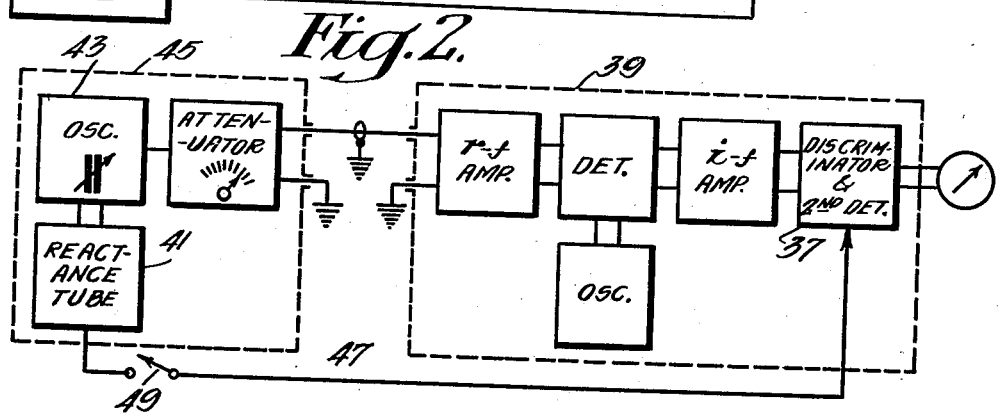
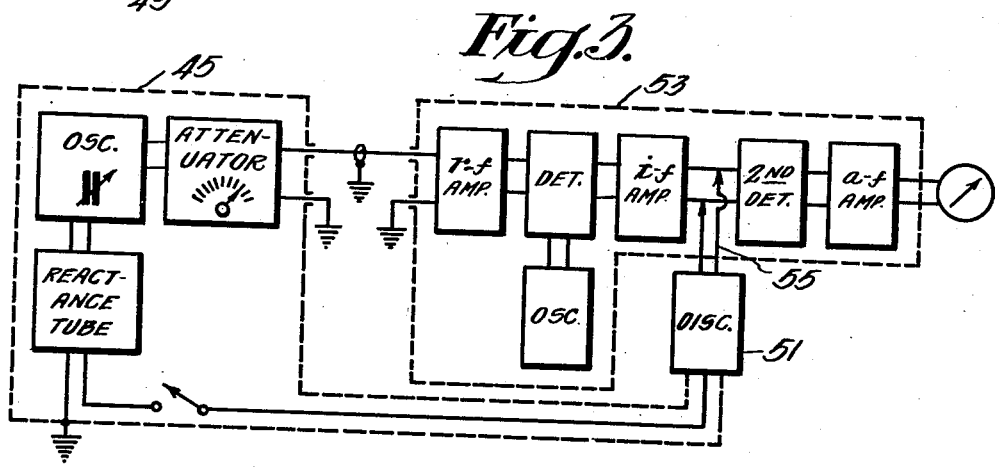
Inventor
Donald S. Bond
By
Attorney Patented Sept. 15, 1942

2,295,629

UNITED STATES PATENT OFFICE 2,295,629

FREQUENCY CONTROL SYSTEM

Donald S. Bond, Philadelphia, Pa., assignor to Radio Corporation of America, a corporation of Delaware Application October 31, 1940, Serial No. 363,633

12 Claims. (Cl. 250—1)

This invention relates to frequency control systems and its principal object is to provide a method of and means for facilitating tests and measurements made with or on a radio receiver in conjunction with an external signal generator, by controlling automatically the frequency of the signal generator.

A particularly useful application of this invention is in connection with a device known to those skilled in the art as a "field intensity meter." As its name implies, such an instruments is used to measure the field intensity of radio transmitters. For example, if the radiation characteristic of a directional antenna array is desired the field intensity is measured at a number of points about the antenna and with this information the desired characteristic can be plotted. The field intensity meter itself conventionally employs a receiver having a loop antenna, an output indicator, and a separate reference oscillator whose output is known. Measurements are made by comparing the signal from the reference oscillator to a signal from a transmitter. The present invention improves the previously known field intensity meter by coupling a discriminator to the receiver and using the derived direct voltage to control the frequency of the reference oscillator. It is therefore an object of this invention to provide an improved field intensity meter.

Another valuable application of this invention is in connection with the test of radio receivers, either in the factory or in service shops. Performance tests are conventionally made by means of a calibrated signal generator. If precise measurements are to be made the generator and receiver must be maintained in exact resonance. This is not always easy, particularly at high frequencies, and the generator usually requires constant checking and readjustment. In accordance with a further object of this invention, a control circuit is provided which automatically holds the generator at the resonant frequency of the receiver.

This invention will be better understood from the following description when considered in connection with the accompanying drawing. Its scope is indicated by the appended claims.

Referring to the drawing, Figure 1 is a block diagram of a field intensity meter; Figure 2 is a block diagram of a signal generator for use with a receiver having a discriminator as an element thereof; and Figure 3 is a block diagram of a signal generator, which includes a discriminator as an element, for use with a receiver which does not have a discriminator.

Referring to Fig. 1, the various elements of a field intensity meter are indicated in block diagram form. Since each element is in itself well known to those skilled in the art and may take many different forms, the specific circuits have not been illustrated. The receiver portion of the meter includes a loop antenna 5 coupled to a tunable R.-F. amplifier 7 which is coupled to a first detector or mixer 9. A local oscillator 11 is also coupled to the mixer to beat with the incoming signal and produce an intermediate frequency signal, which is then amplified in the I.-F. amplifier. The amplified I.-F. signal is applied to a discriminator 15, preferably of the push-pull or balanced type, through an attenuator 21. A microammeter 29 is connected in series with the cathode of one of the discriminator tubes, for example, so that it indicates the amplitude of the rectified carrier current. Audio frequency modulation output is also taken from the discriminator and applied to an output device such as a pair of head phones 31, through an A.-F. amplifier 19.

The voltage output of the discriminator varies above or below some convenient reference potential, ground, for example, as the frequency of the signal in the I.-F. amplifier varies above or below the frequency to which the I.-F. amplifier and the discriminator are tuned. This voltage may be applied to a reactance tube 16 through a switch 33 to control the frequency of the receiver local oscillator 11, if desired. The elements described so far, with the exception of the attenuator 21, constitute a conventional superheterodyne receiver with automatic frequency control. For the purpose of measuring field intensity, the attenuator 21 is calibrated in convenient steps.

The field intensity meter also includes a reference oscillator 23, tunable over a range corresponding to the useful range of the meter. The output of this oscillator is metered and is adjustable to any convenient value. The output is applied to a loop antenna 27 which is closely coupled to the receiver loop 5, and the two may be wound on a common form. The reference oscillator tuning condenser may be operated by a uni-control means along with the R.-F. amplifier, mixer and local oscillator condensers. The reference oscillator is provided with an "off-on" switch. A reactance tube 25 is also coupled to the reference oscillator for controlling its frequency. The reactance tube is controlled by the voltage derived from the discriminator 15. A switch 35 is included in this circuit so that this control function may be interrupted when desired.

The operation of a field intensity meter in measuring the field strength of a transmitter is as follows. With the reference oscillator off, and the switch 33 open, the receiver is accurately tuned in to the transmitter. The phones 31 are useful in identifying the transmitter. The attenuator 21 is then adjusted to give a convenient reading on the output meter 29. The reference oscillator 23 is then turned on and its output adjusted to produce a signal in the receiver of considerably greater intensity than that of the transmitter. To compensate for this, the attenuator 21 is readjusted until the reading of the output meter is the same as before, or nearly the same, the output of the reference oscillator also being used to make this adjustment.

Before taking readings, however, it is necessary to tune the reference oscillator to exact resonance with the receiver. This adjustment must be precisely made. Since the tuning condensers of the receiver and reference oscillator are coupled together the oscillator frequency is easily held at approximately the correct value, but a trimmer adjustment has been required heretofore to make the final exact adjustment. Now the trimmer adjustment not only had to be accurately made, but also had to be repeatedly checked during a measurement. The proposed reactance tube 25, however, makes this adjustment automatically and continuously, thus eliminating the possibility of error in the measurement due to mistuning. Consequently, after tuning the receiver to the desired station it is only necessary to turn on the reference oscillator and close the switch 35 and the reference oscillator will then be pulled into and maintained at the proper frequency indefinitely.

The reason for making the intensity of the reference oscillator greater than that of the signal is to make the two indications independent. That is, when the reference or calibrating signal is applied to the receiver the effective sensitivity of the receiver is reduced to such an extent that the transmitter signal is not received. This can be checked by noting that the output meter goes to zero when the reference oscillator is off and the attenuator in the calibrate or high attenuation position.

The actual calculation of the field intensity of the transmitter requires a knowledge of the dimensions of the loops, their coefficient of coupling, the output of the reference oscillator and the attenuation ratio. These calculations, however, are not a part of the present invention, and are well known to those skilled in the art.

Fig. 2 illustrates another embodiment of this invention in which a receiver having A. F. C. is connected to a signal generator for the purpose of making tests of the receiver sensitivity, distortion, maximum output, and the like. In each case it is, of course, necessary to maintain the generator in exact resonance with the receiver. In order to simplify the measurement, this condition of resonance is automatically maintained by utilizing the discriminator 37 of the receiver 39 to control a reactance tube 41 coupled to the oscillator 43 of the signal generator 45. For this purpose the signal generator is provided with a lead 47 which may be clipped onto the proper point of the receiver discriminator circuit. A switch 49 is included in this lead to permit the control voltage to be disconnected at will, as when the receiver and generator are to be tuned to a different frequency.

Fig. 3 is a further embodiment in which a discriminator 51 is included as a part of the signal generator 45, for use when testing an ordinary superheterodyne receiver 53 having no built-in discriminator. The unit is provided with a clip lead 55 for connecting the discriminator to the output of the receiver I.-F. amplifier. This lead is preferably as short as possible. The input impedance of the discriminator is preferably high, so as not to detune the I.-F. amplifier of the receiver. During the test of the receiver, and also during alignment of the R.-F. and mixer circuits, the frequency of the generator is held at the proper value, thus greatly facilitating the measurements, and assuring proper alignment. Within reasonable limits the receiver characteristics may be measured at different frequencies without having to retune the generator, since the A. F. C. action will shift the generator when the tuning of the receiver is changed. For greater frequency changes, it is only necessary to give the generator an approximate frequency adjustment, the discriminator then taking control and putting the generator exactly on the frequency to which the receiver is tuned.

I claim as my invention:

1. In a field measuring system having a receiver responsive to a signal to be measured and a separate reference oscillator coupled to said receiver, the method of operation which comprises tuning said receiver to the frequency of said signals, tuning said reference oscillator to substantially the same frequency, deriving a potential whose amplitude varies as a function of the difference between the responsive frequency of said receiver and the frequency of said oscillator, and applying said potential to said oscillator and said receiver to minimize said difference.

2. In a measuring system including a superheterodyne receiver having a local oscillator and responsive to a signal whose intensity is to be measured and a reference oscillator coupled to said receiver for establishing a reference signal of known intensity, the method of operation which includes the steps of tuning said receiver to the frequency of said signals, tuning said reference oscillator to approximately the same frequency, deriving a potential whose amplitude varies as a function of changes in the difference between the intermediate frequency of said receiver and the frequency of said reference oscillator, applying said potential to said local oscillator to control the tuning of said receiver and also utilizing said potential to vary the frequency of said reference oscillator in a direction tending to compensate for said changes.

3. The method of measuring the field intensity of a transmitted signal which comprises receiving said signal, producing an output indication varying with the field intensity of said signal, radiating locally reference signals of known field intensity, comparing said received signal and said locally radiated signal, deriving a potential which varies as a function of changes in the frequency of said reference signals, and utilizing said potential to compensate for changes in the frequency of said reference signals.

4. In a system for measuring the characteristics of a receiver by means of a signal generator, the method of operation which includes the steps of coupling said generator to said receiver, deriving a potential from said receiver, the amplitude of said potential varying as a function of the misalignment of said generator and said receiver, and measuring the characteristics of said receiver while applying said potential to control the frequency of said generator.

5. A field intensity meter comprising a tunable receiver for receiving a signal to be measured, a source of reference oscillations, means for applying said reference oscillations to said receiver, means for deriving a potential proportional to the difference in frequency between said reference oscillations and the resonant frequency of said receiver, means for controlling the frequency of said reference oscillations by means of said potential, and means for comparing the intensities of said signal and said reference oscillations.

6. A field intensity meter comprising a tunable receiver for receiving a signal to be measured, a source of reference oscillations tunable with said receiver to approximately the resonant frequency thereof, means for automatically correcting the frequency of said source to maintain said reference oscillations at exactly the resonant frequency of said receiver, an output indicator for said receiver, and attenuator means for measuring the relative intensities of said signal and said reference oscillations.

7. A measuring system comprising a receiver tunable over a range of frequencies, a source of signals for said receiver, and means interconnecting said receiver and said source for controlling the frequency of said signals to thereby maintain said signals at the resonant frequency of said receiver.

8. A signal generator for measuring the characteristics of a radio receiver comprising a source of oscillations, means for applying said oscillations to said receiver, frequency control means for manually varying the frequency of said oscillations, a discriminator, means for coupling said discriminator to said receiver to produce a voltage varying with changes in the frequency of the oscillations applied to said receiver, and means for utilizing said voltage to maintain the frequency of said oscillations at a value determined by the tuning of said receiver.

9. A signal generator for measuring the characteristics of a superheterodyne radio receiver having an intermediate frequency amplifier, said generator including a source of oscillations, means for applying said oscillations to the input of said receiver, a discriminator, means for coupling said discriminator to said intermediate frequency amplifier to produce a voltage whose amplitude and polarity are dependent upon the frequency of signals in said amplifier, and means for utilizing said voltage to control the frequency of said source of oscillations to compensate for changes in the frequency of signals applied to said intermediate frequency amplifier.

10. A signal generator for measuring the characteristics of a superheterodyne radio receiver having a frequency converter for producing intermediate frequency signals and an intermediate frequency amplifier for said signals, said generator comprising a source of oscillations of variable frequency, means for applying said oscillations to the input of said receiver, frequency responsive means adapted to be coupled to said radio frequency amplifier for deriving a voltage whose amplitude and polarity are a function of the frequency of said intermediate frequency signals in said amplifier, means controlled by said voltage for varying the frequency of said oscillations so as to maintain constant the frequency of said signals, and means for interrupting said control to permit said receiver and said generator to be tuned to other frequencies.

11. In a system for measuring the intensity of signals from a transmitter, said system having a receiver and a separate source of oscillations, the method of operation which includes the steps of adjusting said receiver to the frequency of said signals, applying to said receiver oscillations from said source of approximately the same frequency, deriving a potential whose amplitude is determined by the difference between the frequency of said oscillations and the resonant frequency of said receiver, and utilizing said derived potential to control the frequency of said oscillations to thereby maintain said oscillations at the resonant frequency of said receiver.

12. In a system for measuring the intensity of signals from a transmitter, said system having a receiver and a separate source of reference oscillations, the method of operation which includes the steps of resonating said receiver and tuning said oscillator to the frequency of said signals, applying said reference oscillations to said receiver, deriving a potential from said receiver which varies as a function of the difference between the resonant frequency of said receiver and the frequency of said oscillations, and utilizing said derived potential to vary the frequency of said oscillations to minimize said difference.

DONALD S. BOND.